May 6, 1969
W. D. TAYLOR
3,442,395
PLASTIC DISH DRAINER
Filed Sept. 5, 1967
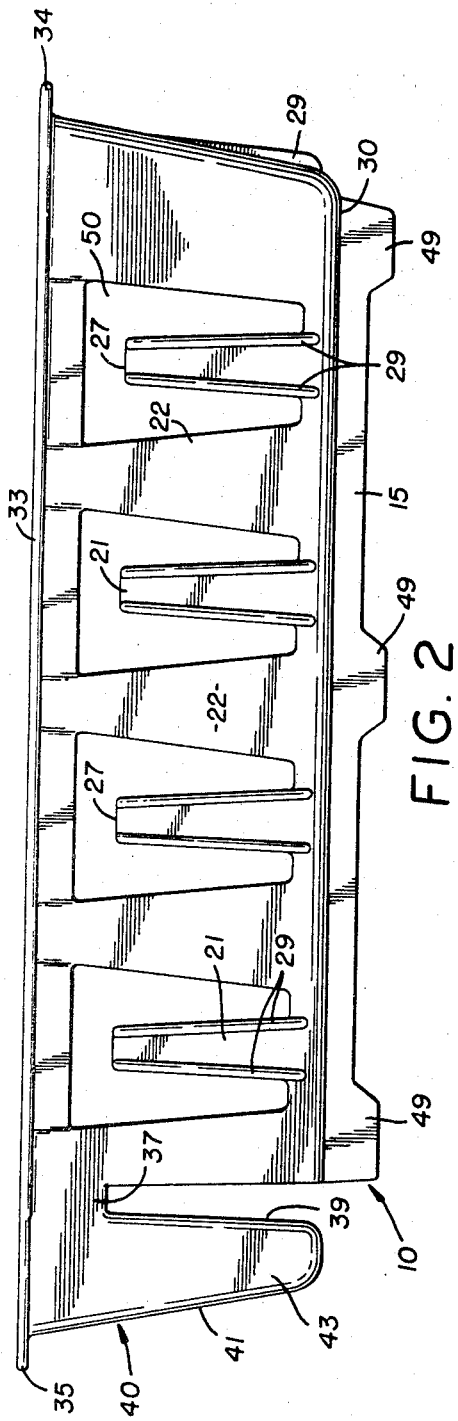
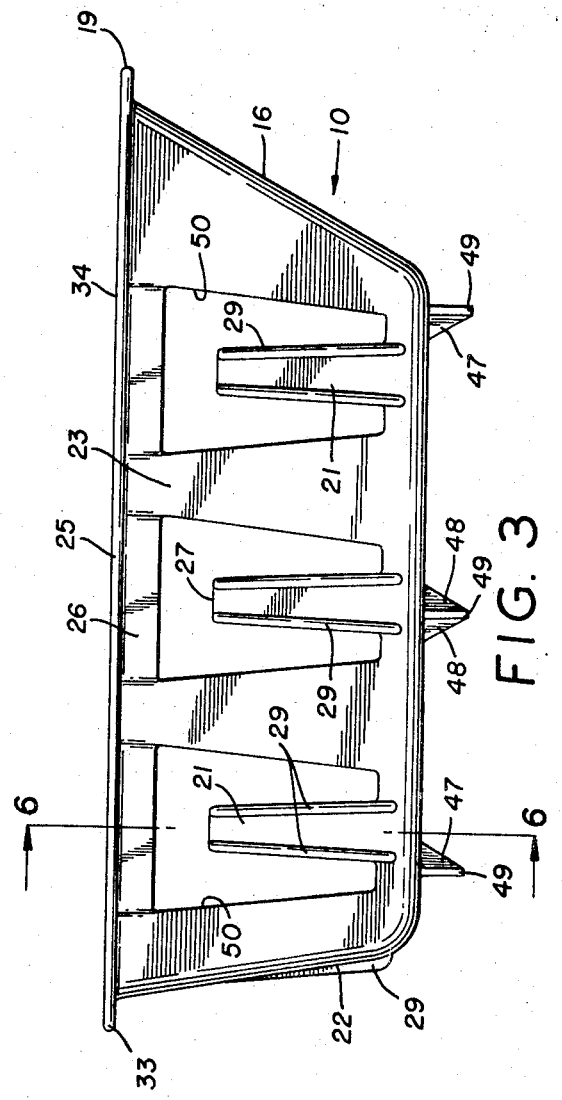
INVENTOR.
WILLIAM D. TAYLOR
BY Hamilton & Cook
ATTORNEYS

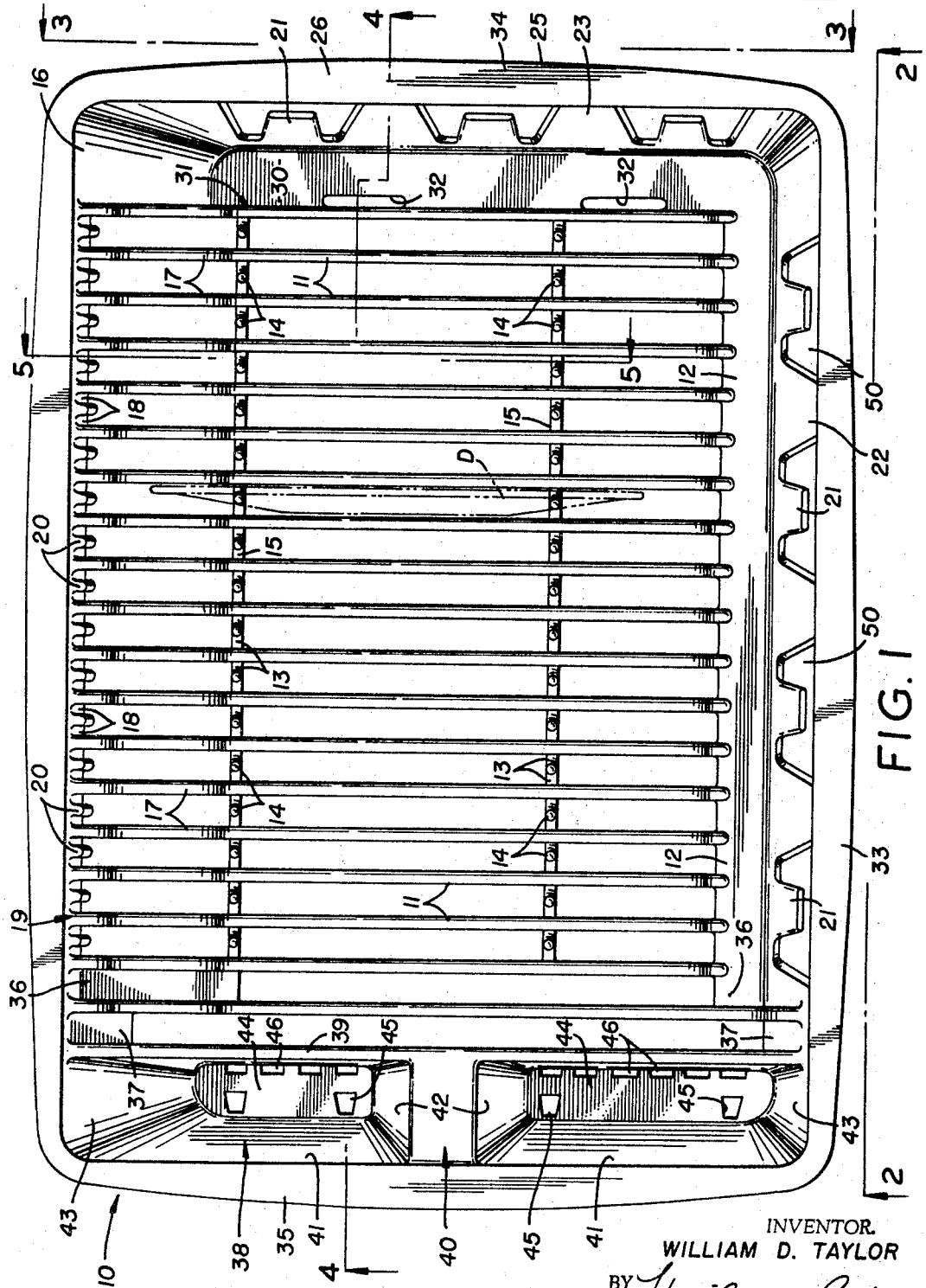

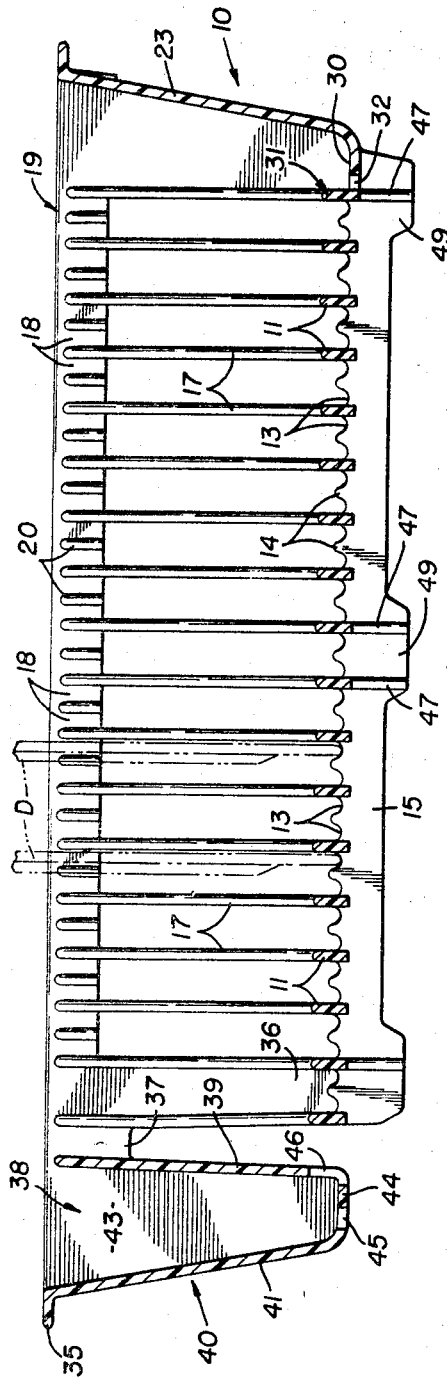
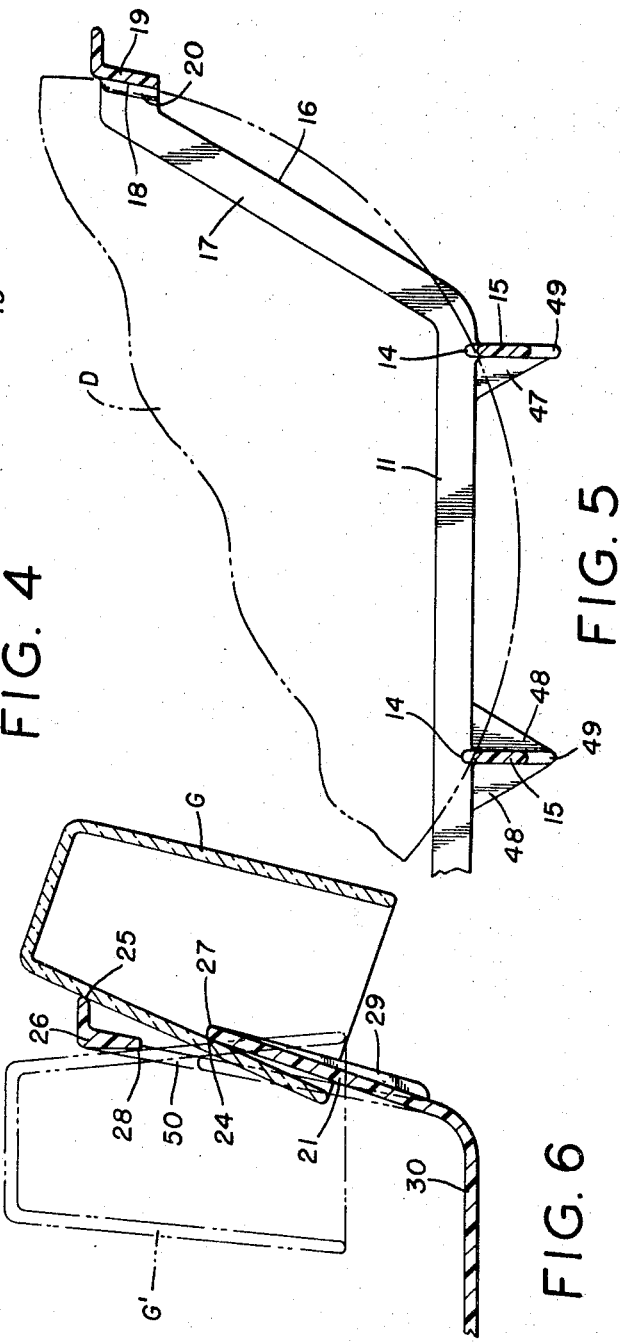

United States Patent Office 3,442,395
Patented May 6, 1969

3,442,395
PLASTIC DISH DRAINER
William D. Taylor, Wooster, Ohio, assignor to Rubbermaid Incorporated, Wooster, Ohio, a corporation of Ohio
Filed Sept. 5, 1967, Ser. No. 665,548
Int. Cl. A47g *19/08;* B65d *1/24, 1/36*
U.S. Cl. 211—41                           5 Claims

ABSTRACT OF THE DISCLOSURE

A plastic dish drainer having a flat bottom consisting of parallel ribs spaced a short distance apart and extending continuously into an inclined side wall of the drainer. The opposite side wall and one end wall contains upright resilient tabs for holding glassware, and the other end wall comprising two built-in cutlery holders.

Background of the invention

Prior dish drainer constructions of which I am aware have been of wire and have had inherent capacity limitations due to the generally upstanding plate-holding humps on the bottom surface of the drainer which severely limited the function of that portion of the apparatus to merely holding dishes. Moreover, this structure has presented a dish organization limitation and breakage problem in that the upstanding humps not only rendered that portion of the dish drainer susceptible to no other use but also did not effectively hold the plates or dishes securely in place. Thus, a slight jar to the plate or the drainer itself sometimes caused dish breakage.

In certain other prior dish drainers with various types of wire structures provided for supporting glasses, cups, or the like, the non-resiliency of the material either caused a shorter useful life of the glass holders and drainer itself, or created a breakage hazard to the glasses themselves.

Still other past constructions provided for a detachable cutlery holder which not only had severe capacity limitations, but which also was susceptible to being tipped, spilled, or otherwise accidently detached.

Furthermore, other past constructions, made of wire coated with an elastomeric compound, had inherent defects such as susceptibility to cutting by utensils, rusting, and the like, so that the useful life and attractive appearance of the dish drainer was hindered.

Summary of the invention

The invention comprises a plastic dish drainer having a flat bottom whereby dishes are held in a firmly upright position by parallel rib members within said flat bottom which, by being spaced fairly close together and by extending into one side wall of the said drainer, hold the dishes firmly. Spaced between each rib on the flat bottom are projections which further act to hold the dishes in place. Two other side walls contain upright, resilient tabs to hold glasses, cups, and the like firmly yet safely in inverted position and allow a maximum of drainage therefrom. At one end of said drainer are rectangular, built-in cutlery holders of sufficient depth to hold knives, forks, and the like.

Thus, a dish drainer built by the present invention provides for the many organizational, safety, capacity, and appearance features which were lacking in the prior art.

It is therefore apparent that an object of this invention is to provide a dish drainer with a flat bottom to enhance its capacity and functional flexibility.

It is another object of this invention to provide a dish drainer, as above, which will securely hold a variety of shapes and sizes of dishes.

Another object is to provide dish holding slots extending continuously from the bottom into at least one side wall to more securely hold a plurality of dishes in position.

Another object is to provide projections at intervals between the slots to grip the edges of dishes inserted within the slots.

It is a further object of this invention to provide a dish drainer with a resiliently flexible lifetime glass-holding structure so as to grip the glasses easily, yet securely and safely.

It is still another object of this invention to provide built-in cutlery holders to eliminate the accidental dumping thereof and to increase its entire holding capacity.

Finally, it is an object of this invention to construct a dish drainer out of a plastic material, suitable for the molding thereof, to provide for a longer-lasting, sturdy but resilient, and better appearing dish drainer.

Various other objects and advantages will appear from the following description taken in conjunction with the attached drawings, and the novel features will be particularly pointed out hereinafter in the appending claims.

Brief description of the drawings

FIG. 1 is a top view of the preferred embodiment of the invention, showing a plate in one position.

FIG. 2 is a side view taken along line 2—2 of FIG. 1, showing more completely the upright tab members.

FIG. 3 is an end view taken along line 3—3 of FIG. 1.

FIG. 4 is cross sectional view on line 4—4 of FIG. 1.

FIG. 5 is a partial cross sectional view on line 5—5 of FIG. 1 showing a preferred relationship between the bottom and inclined sidewall.

FIG. 6 is a cross sectional view on line 6—6 of FIG. 3 showing a tab member and different uses thereof.

Referring generally to FIG. 1, numeral 10 indicates the basic dish draining construction shown in its preferred form. This construction is best formed by a plastic material hereinafter described but generally suitable to form the various members molded within the drainer 10. The advantages of using such a plastic material will become more evident in the following disclosure.

Rib members 11 are molded into the bottom surface of drainer 10, preferably extending laterally from a solid angular side portion 12, and are spaced a short distance apart so as to securely hold dishes, plates, saucers, and the like, such as D, in the slots 13 formed thereby. The solid side portion 12 is somewhat L-shaped to provide enhanced rigidity of the structure, being merged into side wall 22 as will be seen later. As best seen in FIG. 4, the plurality of rib members 11 combine so that their upper edges form a substantially flat bottom surface. It is thus evident that the bottom surface of drainer 10 can be used not only for holding dishes, but also for stacking dishes or placing extra glasses thereon. The hump in the bottom of past dish draining constructions severely limited this extra use. Note also that the ribs 11 are placed close enough together so that slots 13 are relatively narrow thus decreasing the bothersome possibility of small items falling through the drainer and into the sink or drainboard.

Continuing, formed within each slot 13 is a nipple-like protuberance 14 extending upwardly out of an extension above two of the supporting ribs 15 running longitudinally under and connected to the ribs 11. As seen in FIGS. 1 and 4, between each pair of rib members 11 within each slot 13 are two of these protuberances 14, one extending from the upper edge of each longitudinal rib 15 shown. The protuberances 14 in conjunction with ribs 11 more securely hold the beveled edge of dishes D in place within slot 13.

As shown in FIG. 5, one side wall 16 of drainer 10 is inclined more from the vertical than the other side wall 22. Since the angle of this inclination is not particularly critical, FIG. 5 shows only a typical slope thereof. The bottom rib members 11 are generally molded so as to continue into the side 16 thus forming side wall ribs 17 and slots 18 therebetween. The side wall ribs 17 in conjunction with the bottom ribs 11 thus hold the dish D securely. It can be seen that by molding the rib members close enough together, a bumping of the dish or the drainer itself will not cause the dish to fall and be damaged thereby.

The upward ends of side wall ribs 17 are molded into a top rim support member 19 of drainer 10. Support 19 contains outward ridges 20 within each slot 18. When large plates or platters are used, so that the circumference of such platter extends up the entire length of side wall ribs 17, these ridges 20 act like, and in conjunction with, protuberances 14 to aid in holding the platter or plate in place.

In the preferred embodiment shown, the side wall 22 and end wall 23 contain upright tab members 21. These tabs 21 are molded within trapezoidal cutouts 50 of side wall 22 and end wall 23 so as to hold generally cylindrical containers such as glasses, cups, mugs, measuring cups, and the like in an inverted draining position. Being made of a molded plastic material, tabs 21 are resilient in nature so that glasses G and G', as shown in FIG. 6, can be slid easily in an inverted manner onto the tabs. Although the preferred organizational manner of use would be to place a glass G on the outside of the drainer 10, so that the inside of the drainer would be free for other uses, as shown in full lines in FIG. 6, glasses such as G' can also be placed on the inside of drainer 10 as shown in chain lines, if, for example, the drainer were placed in such a confined area, as a sink, where there was no room for glasses and the like on the outside of said drainer.

When placed on the outside, glass G is securely but safely held between the inside surface 24 of tab 21 and the outside edge 25 of top support member 26 of drainer 10. When placed on the inside, glass G' is securely but safely held between the outside surface 27 of tab 21 and the inside surface 28 of top support member 26. Note that gradually tapered flanges 29, of tab members 21 give added strength to the tab 21 and also give it added shape so as to more securely hold the glass G'. Unlike prior constructions, these resilient tab members 21 will not wear out to the extent of remaining bent in one certain position.

For the embodiment shown, the tabs 21 in the side wall 22 extend out of the upward branch of the L-shaped bottom brace member 12 and into trapezoidal cutouts 50. The tabs 21 in the end wall 23 extend out of the upper branch of the L-shaped bottom brace member 30 and into other trapezoidal cutouts 50.

It will be noticed that the end rib 11 nearest to end wall 23 is molded to bottom brace 30. This connection forms a ridge indicated generally at 31 along the connection of rib 11 and bottom brace 30 which could at times hold stagnant water. Thus, holes 32 are provided in bottom brace 30 to preclude the possibility of any stagnant water collecting on the surface of bottom brace 30 or along ridge 31.

Thus it can be seen that while the structure is basically open for drainage purposes, the molding is such that members 12, 19, and 30, along with walls 22 and 23 provide much of the necessary support to make drainer 10 a sturdy construction. Furthermore, side wall 22 terminates at its upwardmost point at edge 33 and end wall 23 terminates at its upwardmost point at edge 34. Edges 33 and 34 are integrally connected to each other as are walls 22 and 23. Edges 33 and 34 are also connected to top support member 19 as are walls 16 and 23, to add to the sturdiness of the structure. Further adding to this sturdiness, the space between the side wall rib members 17 closest to the cutlery-holding apparatus referred to in general as numeral 40 and hereinafter described in more detail, is solidified into support member 36 in the preferred embodiment.

It should be noted that top support edges 19, 33, and 34, are of an L-shaped nature and when combined with edge 35 formed at the top of the cutlery-holder apparatus 40, allow one to easily grip and carry the drainer 10 from place to place. Carrying is further made simple for the housewife in that the plastic material is generally lighter than the wire of the prior art.

Extending from both of the side walls, 16 and 22, are short brace portions 37 which support and integrally connect the cutlery-holding apparatus 40 to the main portion of the dish drainer 10.

The cutlery-holding apparatus 40 can consist of a number of or even a single compartment. As shown in FIG. 1, a preferred arrangement consists of two such compartments 38. The innermost wall 39 of compartments 38 is substantially vertical while the back wall 41 and side walls 42 and 43 are tapered so that the upper rectangular openings of compartments 38 are substantially larger than their bottom rectangular surfaces 44.

The entire cutlery-holder apparatus 40 being integrally connected by way of brace portions 37 to drainer 10 not only protects the silverware from being spilled but also is more jar-resistant to keep the silverware from bumping and therefore scratching or nicking each other. The prior art generally involved removable cutlery holders which were quite susceptible to spilling and jarring the silverware contained therein due to the usually flimsy and temporary connecting means.

Formed within the bottom surfaces 44 of the cutlery compartments 38 are trapezoidal-shaped holes 45 which allow water to drain off of the cutlery. More trapezoidal drainage holes 46 are provided in the bottom 44 which extend into the innermost wall 39 of the cutlery compartments 38. These holes 46 allow for a more efficient drainage when the water in compartments 38 becomes too extensive for bottom holes 45 to manage the efficient drainage thereof. Such is often the case when the dish washer uses a mass rinsing system for the cutlery whereby all of the soapy cutlery is placed within the holders and water from the tap is allowed to run into the containers for rinsing purposes. Under such a system, if the dish washer failed to turn off the tap water, being momentarily distracted, a minor flooding of the drainboard area might occur. By thus extending the holes 46 up into the innermost wall 39, water at a higher level is able to run out of the cutlery compartments thus diminishing the possibility of such minor flooding.

The leg structure of the drainer 10 in the preferred embodiment consists of downwardly directed feet members 49 on the longitudinal ribs 15, the outside feet members each having an inner web portion 47, and center foot members having dual web portions 48 at the ends. These web portions give added strength to the feet of the drainer. The combined height of the longitudinal ribs 15 and the feet members 49 should be such that any size dish will fit within the slots 13 without touching the surface on which the dish drainer is sitting—such as a sink or drainboard. Further, the drainer should be of such a height to allow reasonably large glasses and the like to be placed on tabs 21.

Note that a dish drainer as described in the above specification is generally molded out of a plastic material such as linear polyethylene, or other suitable and well-known plastic material. Characteristic of this plastic material is that it will not chip, scratch, stain, rust, or lose its molded-in color. Nor will it peel or melt if boiling water or grease is poured over it. Furthermore, the legs of the present invention will not scratch the surface it is placed on, such as the enamel of a kitchen sink.

It can thus be seen that a dish drainer made under the above specification will carry out the aforementioned objectives thus substantially improving the dish draining art.

What is claimed is:

1. A plastic dish drainer comprising integral side walls and end walls and a bottom draining surface having multiple substantially parallel ribs forming dish-holding slots therebetween, at least one of said side walls being inclined to the bottom surface and having ribs aligned with said bottom rib members, upright tab means formed in at least one wall thereof for holding substantially cylindrically shaped containers in inverted positions, and an end wall of said drainer having integral cutlery-holding means.

2. A plastic dish drainer according to claim 1 having one or more longitudinal rib members containing nipple-like protuberances for holding dishes within said slots between said substantially parallel ribs.

3. A plastic dish drainer according to claim 1 whereby said bottom rib members extend continuously into said inclined side wall.

4. A plastic dish drainer according to claim 1 whereby said upright tab means are selectively resiliently movable to the exterior or interior of said dish drainer.

5. A plastic dish drainer according to claim 2 whereby said side wall rib members terminate in an upper rim support member, said member having ridges extending between each said side wall rib member to further restrain dishes in said slots.

References Cited
UNITED STATES PATENTS

| | | | |
|---|---|---|---|
| 2,864,509 | 12/1958 | Watral | 211—41 |
| 3,027,041 | 3/1962 | Stansbury | 211—41 X |
| 3,338,421 | 8/1967 | Lyman | 211—41 |

CHANCELLOR HARRIS, *Primary Examiner.*

U.S. Cl. X.R.

220—21